(12) United States Patent
Ichikawa

(10) Patent No.: US 8,987,941 B2
(45) Date of Patent: Mar. 24, 2015

(54) POWER TRANSMISSION SYSTEM

(75) Inventor: Keiichi Ichikawa, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 689 days.

(21) Appl. No.: 13/207,015

(22) Filed: Aug. 10, 2011

(65) Prior Publication Data

US 2012/0038218 A1 Feb. 16, 2012

(30) Foreign Application Priority Data

Aug. 10, 2010 (JP) ................. 2010-179109

(51) Int. Cl.
 *H02J 17/00* (2006.01)
 *H02J 5/00* (2006.01)

(52) U.S. Cl.
 CPC ..................... *H02J 5/005* (2013.01)
 USPC ....................................... 307/104

(58) Field of Classification Search
 CPC ....................................... H02J 5/005
 USPC ........... 307/104; 455/62, 63.368, 703, 71, 75, 455/113, 136, 150.1, 161.1, 164.1, 169.1, 455/193.2, 195.1, 227, 262
 See application file for complete search history.

(56) References Cited

U.S. PATENT DOCUMENTS

| | | | |
|---|---|---|---|
| 7,956,495 B2 | 6/2011 | Jin | |
| 8,692,411 B2 * | 4/2014 | Uchida | ............ 307/104 |
| 2008/0231120 A1 * | 9/2008 | Jin | ................ 307/104 |
| 2009/0206675 A1 | 8/2009 | Camurati et al. | |

(Continued)

FOREIGN PATENT DOCUMENTS

| | | |
|---|---|---|
| JP | 2002010535 A | 1/2002 |
| JP | 2003-189508 A | 7/2003 |

(Continued)

OTHER PUBLICATIONS

The first Office Action issued by the State Intellectual Property Office of People's Republic of China on Oct. 23, 2013, which corresponds to Chinese Patent Application No. 201110223671.0 and is related to U.S. Appl. No. 13/207,015.

(Continued)

*Primary Examiner* — Jared Fureman
*Assistant Examiner* — Carlos Laguerre
(74) *Attorney, Agent, or Firm* — Studebaker & Brackett PC

(57) ABSTRACT

A power transmission system a power transmission apparatus, a center frequency acquiring unit, and a control unit. The power transmission apparatus includes a primary-side coupling electrode electrically configured to couple to a secondary-side coupling electrode and connected load circuit of a power receiving apparatus, a high-frequency voltage generating circuit configured to generate and apply a high-frequency voltage to the primary-side coupling electrode, and a driving power circuit that supplies driving power to the high-frequency voltage generating circuit. The center frequency acquiring unit acquires a center frequency at which a high-frequency high voltage applied to coupling electrode is minimized in a state in which a low load is applied to the secondary-side coupling electrode of the power receiving apparatus and the frequency of the generated high-frequency voltage is varied. The control unit sets a driving frequency of the high-frequency voltage generating circuit at or near the center frequency to supply power to the power receiving apparatus.

19 Claims, 11 Drawing Sheets

(56) References Cited

U.S. PATENT DOCUMENTS

| | | |
|---|---|---|
| 2009/0224609 A1* | 9/2009 | Cook et al. .................... 307/104 |
| 2009/0243397 A1* | 10/2009 | Cook et al. .................... 307/104 |
| 2009/0284082 A1* | 11/2009 | Mohammadian ............ 307/104 |
| 2009/0302690 A1 | 12/2009 | Kubono et al. |
| 2010/0052431 A1* | 3/2010 | Mita ............................. 307/104 |
| 2010/0115474 A1 | 5/2010 | Takada et al. |
| 2010/0141042 A1* | 6/2010 | Kesler et al. .................. 307/104 |
| 2010/0148723 A1* | 6/2010 | Cook et al. .................... 320/108 |
| 2010/0176659 A1* | 7/2010 | Aoyama et al. ............... 307/104 |

FOREIGN PATENT DOCUMENTS

| | | |
|---|---|---|
| JP | 2008-236917 A | 10/2008 |
| JP | 2008-236968 A | 10/2008 |
| JP | 2009-081946 A | 4/2009 |
| JP | 2009-089520 A | 4/2009 |
| JP | 2009-531009 A | 8/2009 |
| JP | 2009-213294 A | 9/2009 |
| JP | 2009-296857 A | 12/2009 |
| JP | 2010-104159 A | 5/2010 |

OTHER PUBLICATIONS

"The Second Office Action" issued by the State Intellectual Property Office of People's Republic of China on May 20, 2014, which corresponds to Chinese Patent Application No. 201110223671.0 and is related to U.S. Appl. No. 13/207,015; with English language translation.

* cited by examiner

POWER TRANSMISSION SYSTEM

CROSS REFERENCE TO RELATED APPLICATIONS

The present application claims priority to Japanese Patent Application No. 2010-179109 filed Aug. 10, 2010, the entire contents of which is incorporated herein by reference in its entirety.

TECHNICAL FIELD

The present invention relates to a power transmission system that wirelessly transmits power.

BACKGROUND

Typical wireless power transmission systems adopting a magnetic coupling method are known. In the magnetic coupling method, power is transmitted from a primary coil in a power transmission apparatus to a secondary coil in a power receiving apparatus through a magnetic field. However, since the magnitude of the magnetic flux passing through each coil has large effect on the electromotive force when the power is transmitted by the magnetic coupling method, high-accuracy relative position relationship is required between the primary coil and the secondary coil. In addition, since the coils are used, it is difficult to reduce the sizes of the apparatuses.

Wireless power transmission systems adopting an electrical coupling method are also known. Such a wireless power transmission system is disclosed in, for example, Japanese Unexamined Patent Application Publication No. 2009-296857. In this wireless power transmission system, power is transmitted from a coupling electrode in a power transmission apparatus to a coupling electrode in a power receiving apparatus through an electric field. In the electrical coupling method, the relative position accuracy required for the coupling electrodes is relatively low and the coupling electrodes can be reduced in size and thickness.

FIG. 1 is a block diagram showing the configuration of a power transmission system 100 disclosed in Japanese Unexamined Patent Application Publication No. 2009-296857. Referring to FIG. 1, the power transmission system 100 includes a power feeding apparatus 152 and a power receiving apparatus 154. The power feeding apparatus 152 includes a resonance unit 62 and power feeding electrodes 64 and 66. The power receiving apparatus 154 includes power receiving electrodes 80 and 82, a resonance unit 184, a rectification unit 86, a circuit load 88, a power measuring unit 120, and an impedance control unit 130. The power measuring unit 120 detects voltages at both ends of the circuit load 88 to measure the power value that is currently being supplied to the circuit load 88 and supplies the measured power value to the impedance control unit 130. The impedance control unit 130 controls the voltages at both ends of a variable capacitive element $C_{v1}$ using, for example, a variable capacitance element or the inductance of a variable inductive element $L_{v1}$ on the basis of the power value supplied from the power measuring unit 120 to maximize the power value that is being supplied.

Japanese Unexamined Patent Application Publication No. 2008-236968 discloses a wireless power transmission system composing a charging apparatus, in which recharge after full charge of a secondary cell is considered.

FIG. 2 is a block diagram showing the configuration of the power transmission system disclosed in Japanese Unexamined Patent Application Publication No. 2008-236968. Referring to FIG. 2, a power transmission apparatus 1 includes an oscillation (osc.) circuit 11, a driving clock generating circuit 12, a driver control circuit 13, driver circuits 14a and 14b, capacitors 15a and 15b, a primary coil 16, a current detecting circuit 17, and a control circuit 18.

The primary coil 16 is electromagnetically coupled to a secondary coil 21 in a power receiving apparatus 2 to transmit power from the primary coil 16 to the secondary coil 21 by using electromagnetic induction. The current detecting circuit 17 detects a current flowing through the primary coil 16. The detected current is supplied to the control circuit 18. The control circuit 18 performs certain power feed control on the basis of the current detected by the current detecting circuit 17.

The power receiving apparatus 2 receives power transmitted from the power transmission apparatus 1 and uses the power to charge a secondary (sec.) cell 26. The power receiving apparatus 2 includes the secondary coil 21, a rectifier circuit 22, a smoothing capacitor 23, a regulator 24, a monitor circuit 25, and the secondary cell 26.

The secondary coil 21 is electromagnetically coupled to the primary coil 16 in the power transmission apparatus 1 to induce a voltage. The primary coil 16 and the secondary coil 21 are each composed of a planar coil in which a winding is spirally wound on the same plane. The planes are opposed to each other and are close to each other to cause the electromagnetic induction. The rectifier circuit 22 rectifies the voltage induced in the secondary coil 21. The smoothing capacitor 23 smoothes the voltage output from the rectifier circuit 22. The smoothed voltage is supplied to the regulator 24.

The regulator 24 generates a desired stable voltage on the basis of the smoothed voltage. The generated voltage is supplied to the monitor circuit 25 and the secondary cell 26. A load 27 is connected to the secondary cell 26. The monitor circuit 25 operates in response to the voltage output from the regulator 24 to monitor the voltage of the secondary cell 26 and the current therethrough.

SUMMARY

A power transmission system is disclosed that is capable of increasing power transmission efficiency with simple control and of appropriately controlling the voltage to be supplied to a load.

In a disclosed embodiment, a power transmission system includes a power transmission apparatus, a center frequency acquiring unit and control unit. The power transmission apparatus includes a primary-side coupling electrode configured to electrically couple to a secondary-side coupling electrode and connected load circuit of a power receiving apparatus, a high-frequency voltage generating circuit configured to generate and apply a high-frequency voltage to the primary-side coupling electrode, and a driving power circuit that supplies driving power to the high-frequency high voltage generating circuit. The center frequency acquiring unit is configured to acquire a center frequency in a state in which electrical coupling between the primary-side coupling electrode and the secondary-side coupling electrode and the load circuit is weakened, the center frequency being a frequency at which the generated high-frequency voltage is minimized or substantially minimized with respect to variation in frequency of the high-frequency voltage generated by the high-frequency voltage generating circuit. The control unit is configured to set a driving frequency, which is the frequency of the high-frequency voltage generated by the high-frequency high voltage generating circuit, to the center frequency or a frequency near the center frequency and supply power to the power receiving apparatus.

In a more specific embodiment, a resonant frequency of a first resonant circuit composed of the primary-side coupling electrode and the high-frequency voltage generating circuit may substantially coincide with a resonant frequency of a second resonant circuit composed of the secondary-side coupling electrode and the load circuit, and the center frequency acquiring unit may be configured to acquire the high-frequency voltage within a frequency range including the frequencies of two coupling modes occurring in a state in which the first resonant circuit is coupled to the second resonant circuit.

In another more specific embodiment, a resonant frequency of a first resonant circuit composed of the primary-side coupling electrode and the high-frequency high voltage generating circuit preferably substantially may coincide with a resonant frequency of a second resonant circuit composed of the secondary-side coupling electrode and the load circuit, and the control unit may be configured to set the driving frequency within a frequency range from a higher frequency, among the frequencies of two coupling modes occurring in a state in which the first resonant circuit is coupled to the second resonant circuit, to the center frequency.

In yet another more specific embodiment, the power transmission system may further include a voltage detecting unit configured to detect a high-frequency voltage generated by the high-frequency voltage generating circuit, and the control unit may stop the supply of the power from the driving power circuit to the high-frequency high voltage generating circuit if the voltage detected by the voltage detecting unit is lower than a threshold value.

In another more specific embodiment, the power transmission apparatus may further include a current detecting unit configured to detect an amount of current supplied from the driving power circuit to the high-frequency voltage generating circuit or an amount of current supplied from the high-frequency voltage generating circuit to the primary-side coupling electrode, and the control unit may be further configured to monitor the detected amount of supplied current in a state in which the high-frequency voltage generating circuit is operated at a monitoring frequency different from the driving frequency. If the detected amount of supplied current is higher than or equal to a threshold value, the control unit operates the high-frequency high voltage generating circuit at the driving frequency to supply power to the power receiving apparatus.

In another more specific embodiment, the power transmission apparatus may further include a current detecting unit configured to detects an amount of current supplied from the driving power circuit to the high-frequency voltage generating circuit or an amount of current supplied from the high-frequency high voltage generating circuit to the primary-side coupling electrode, and the control unit may be further configured to stop the supply of the power from the driving power circuit to the high-frequency voltage generating circuit if the amount of supplied current is lower than or equal to a threshold value.

In yet another more specific embodiment, the power transmission system may further include the power receiving apparatus including the secondary-side coupling electrode electrically couplable to the primary-side coupling electrode and the load circuit connected to the secondary-side coupling electrode.

Other features, elements, and characteristics, and advantages will become more apparent from the following detailed description with reference to the attached drawings.

DETAILED DESCRIPTION

In the power transmission system disclosed in Japanese Unexamined Patent Application Publication No. 2009-296857, the voltages at both ends of the circuit load 88 are detected to measure the power that is currently being supplied to the circuit load 88 and controls the capacitance value of the variable capacitive element or the inductance value of the variable inductive element so that the supplied power value is maximized to control the frequency of an alternating-current (AC) signal generated by an AC signal generator. However, this control method is complicated.

In the power transmission system disclosed in Japanese Unexamined Patent Application Publication No. 2008-236968, in the recharge after the full charge of the secondary cell, the primary coil is driven at certain timing, the current flowing through the primary coil is detected after a certain time period elapsed since the start of the driving, and the primary coil is controlled on the basis of the detected current.

The inventor realized, however, that since the current induced in the primary coil is weak, there is a problem in that the system becomes complicated.

Embodiments consistent with the present disclosure can address the above-described shortcomings and provide a power transmission system capable of increasing the power transmission efficiency with simple control and appropriately controlling the voltage to be supplied to a load.

Figure 1:
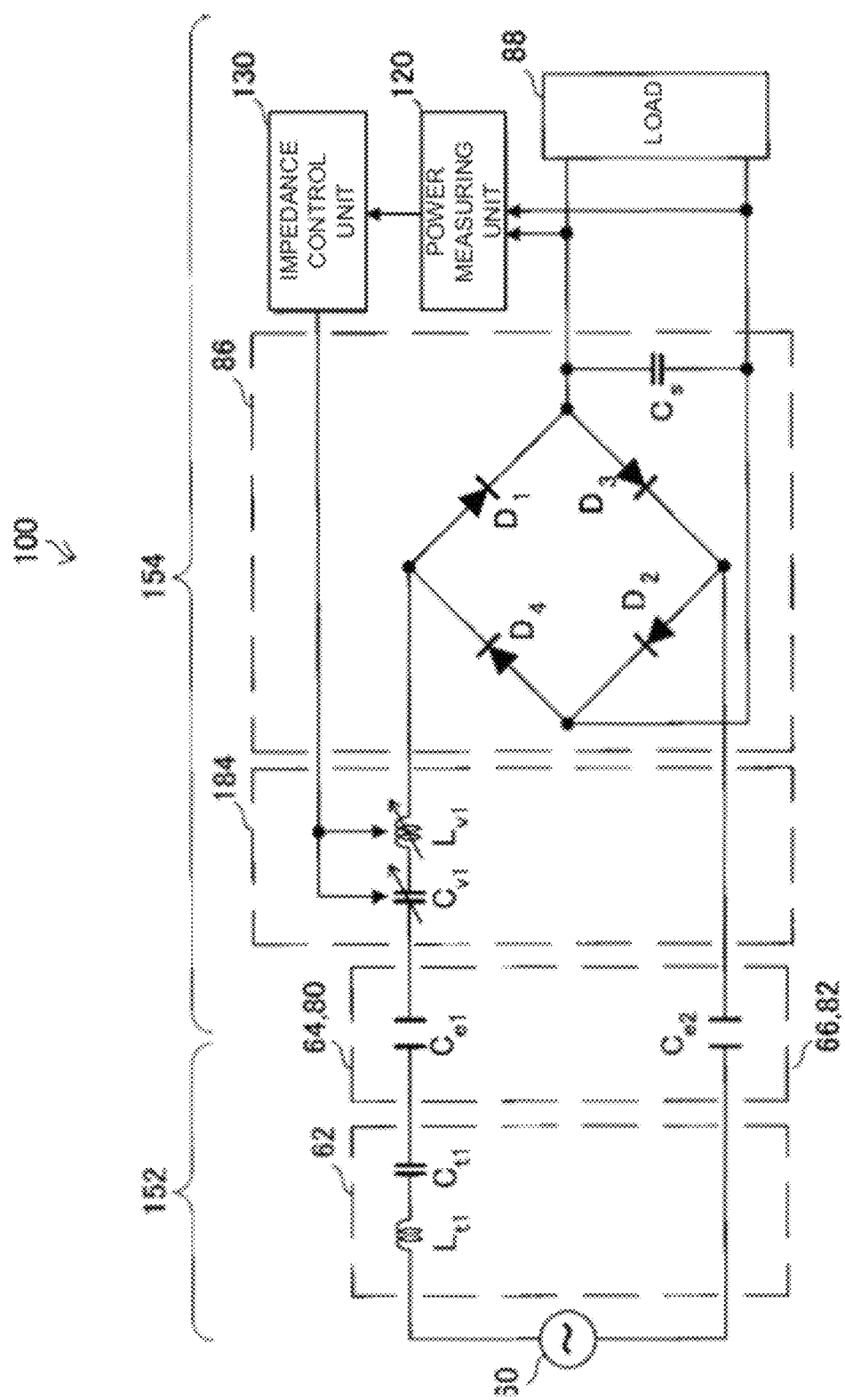
FIG. 1 is a block diagram showing the configuration of a power transmission system disclosed in Japanese Unexamined Patent Application Publication No. 2009-296857.
Figure 2:
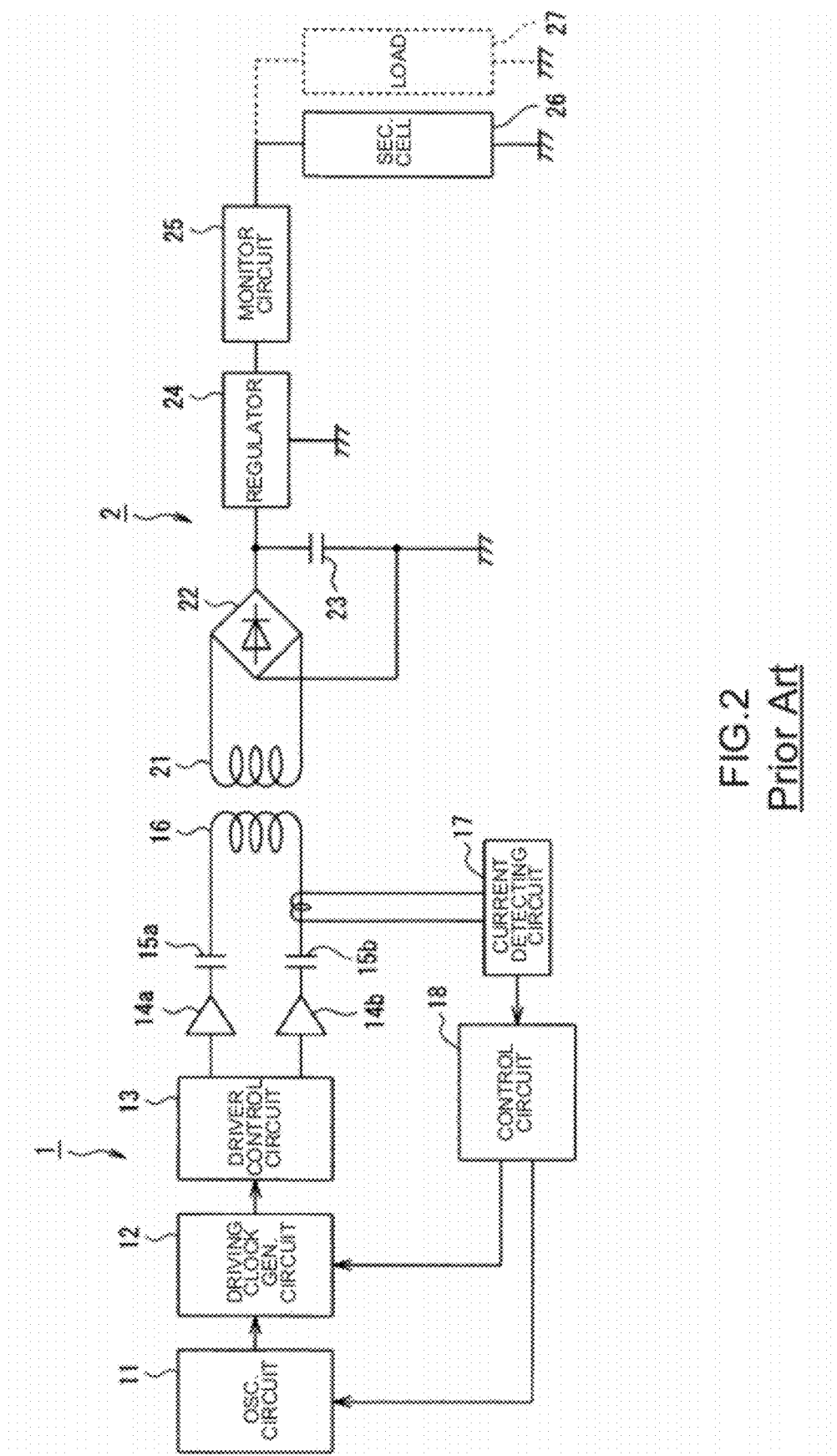
FIG. 2 is a block diagram showing the configuration of a power transmission system disclosed in Japanese Unexamined Patent Application Publication No. 2008-236968.
Figure 3:
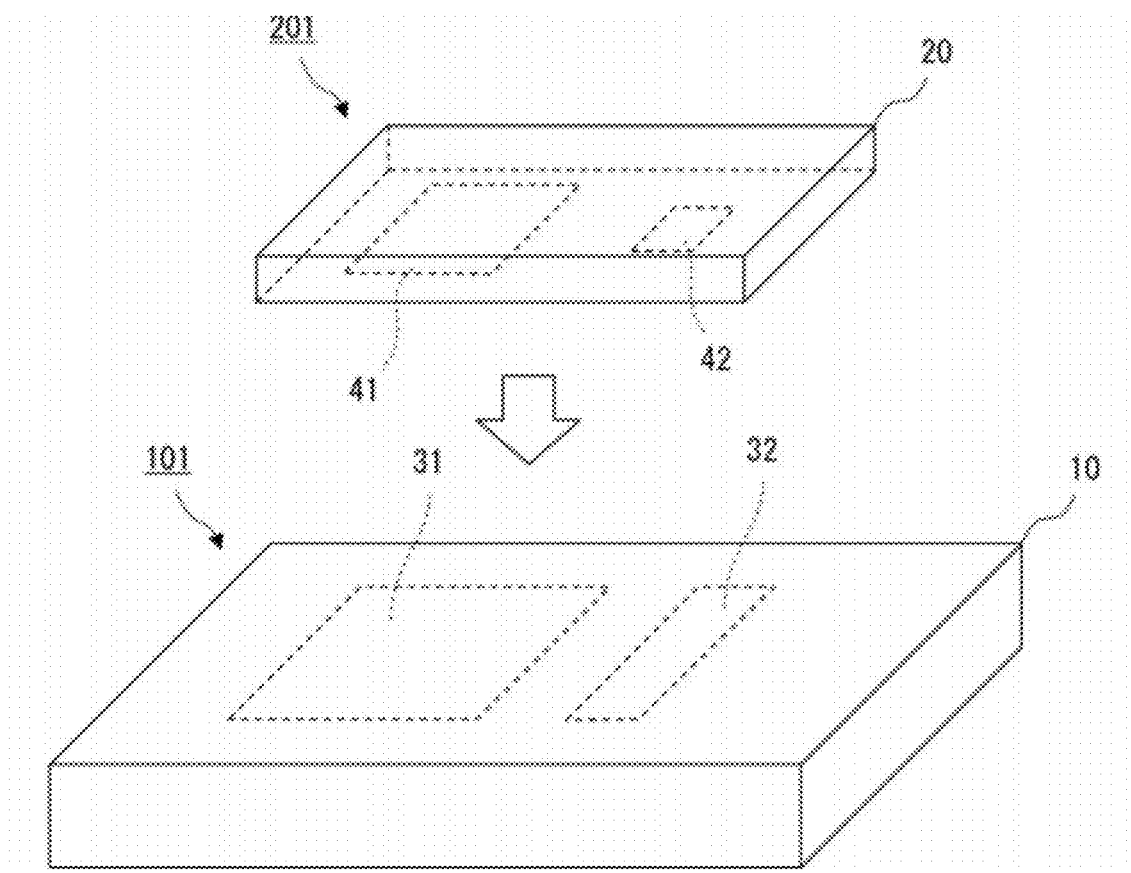
FIG. 3 is a perspective view of a power transmission apparatus and a power receiving apparatus according to a first exemplary embodiment.

With reference now to FIG. 3, a perspective view is shown of a power transmission apparatus 101 and a power receiving apparatus 201 according to a first exemplary embodiment. The power transmission apparatus 101 and the power receiving apparatus 201 compose a wireless power transmission system.

The power transmission apparatus 101 includes a power-transmission-apparatus-side passive electrode 31 and a power-transmission-apparatus-side active electrode 32, and the power receiving apparatus 201 includes a power-receiving-apparatus-side passive electrode 41 and a power-receiving-apparatus-side active electrode 42. The power-transmission-apparatus-side passive electrode 31 and the power-transmission-apparatus-side active electrode 32 correspond to "primary-side coupling electrodes" in the present disclosure. The power-receiving-apparatus-side passive electrode 41 and the power-receiving-apparatus-side active electrode 42 correspond to "secondary-side coupling electrodes" in the present disclosure.

Placing and holding the power receiving apparatus 201 on the power transmission apparatus 101 causes a capacitance between the primary-side coupling electrodes and the secondary-side coupling electrodes. The power transmission apparatus 101 transmits power to the power receiving apparatus 201 in this state by electrical coupling.

The power receiving apparatus 201 is, for example, a communication terminal such as a mobile phone or a notebook-sized personal computer, an electronic device such as a digital camera, or a toy.

Figure 4A:
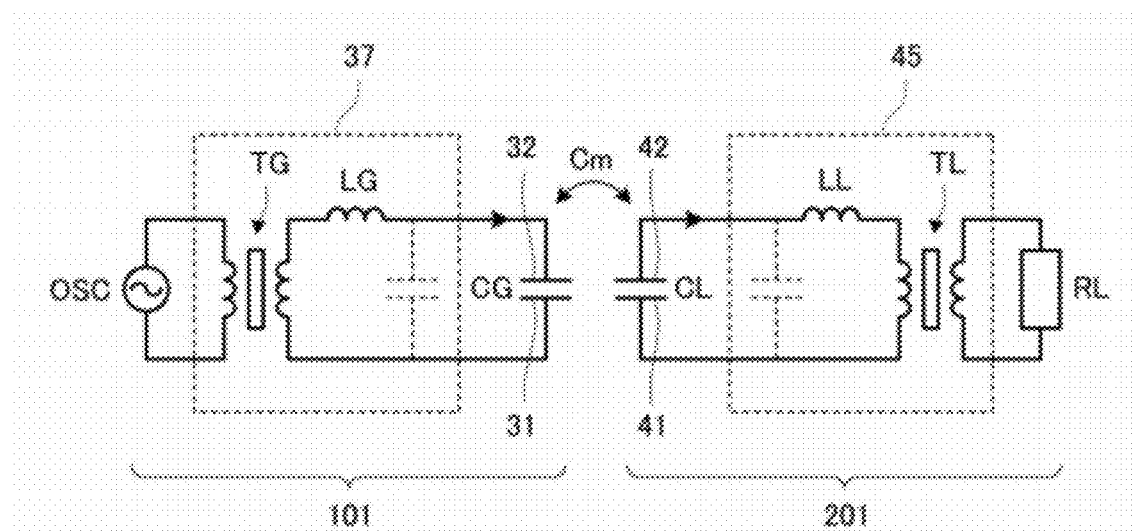
FIG. 4A is an equivalent circuit of a wireless power transmission system.
Figure 4B:
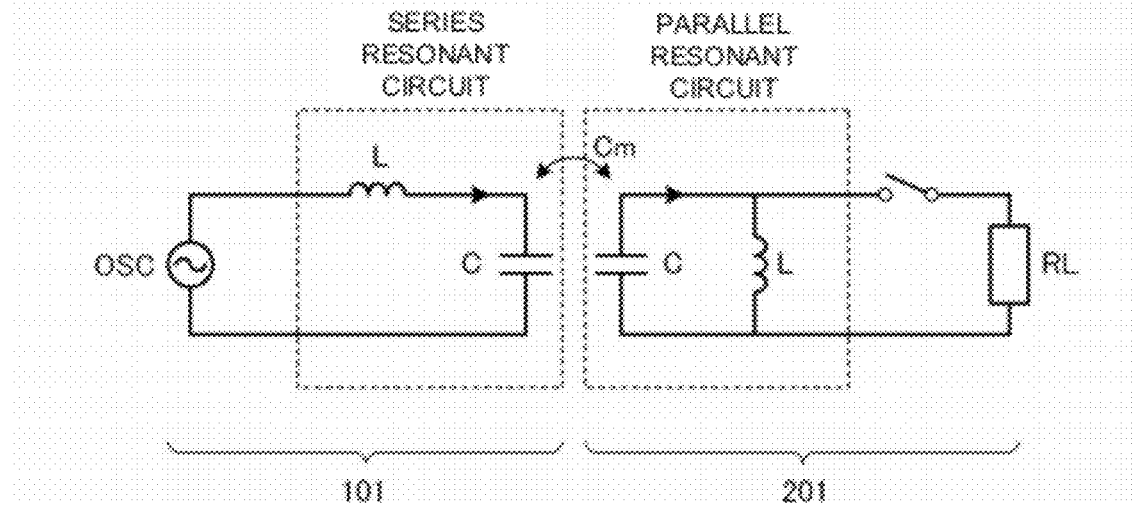
FIG. 4B is an equivalent circuit indicating a state in which a load circuit is disconnected from a second resonant circuit.

FIG. 4A is an equivalent circuit of the wireless power transmission system. FIG. 4B is an equivalent circuit indicating a state in which a load circuit RL is disconnected from a second resonant circuit. Referring to FIG. 4A, a high-frequency high voltage generating circuit OSC in the power transmission apparatus 101 generates a high-frequency voltage of, for example, about 100 kHz to about several tens MHz. A voltage step-up circuit 37 including a step-up transformer TG and an inductor LG increases the voltage generated by the high-frequency high voltage generating circuit OSC to apply the voltage between the passive electrode 31 and the active electrode 32. A capacitor CG has a capacitance caused by the passive electrode 31 and the active electrode 32. The voltage step-up circuit 37 and the capacitor CG correspond to a "first resonant circuit" in the present disclosure. A voltage step-down circuit 45 including a step-down transformer TL and an inductor LL is connected between the passive electrode 41 and the active electrode 42 in the power receiving apparatus 201. A capacitor CL has a capacitance caused by the passive electrode 41 and the active electrode 42. The voltage step-down circuit 45 and the capacitor CL correspond to a "second resonant circuit" in the present disclosure. The load circuit RL is connected at the secondary side of the step-down transformer TL. The load circuit RL is composed of a rectification-smoothing circuit including a diode and a capacitor, and a secondary cell. A capacitor Cm indicates a capacitive coupling state.

How the frequency of a voltage generated by the high-frequency high voltage generating circuit OSC in the power transmission apparatus 101 is set in the circuit shown in FIG. 4A will now be described.

As shown in FIG. 3, after the power receiving apparatus is installed on the power transmission apparatus, an AC voltage value is measured in a frequency range including the resonant frequency of the first resonant circuit and the resonant frequency of the second resonant circuit in a state in which the coupling between the voltage step-down circuit 45 and a load (for example, the secondary cell) in the power receiving apparatus is weakened, preferably, in a state in which the coupling between the voltage step-down circuit 45 and the load is canceled (i.e., the connection therebetween is disconnected). Then, a frequency which is within the frequency range and at which the AC voltage value is minimized is found and the frequency is set as a driving frequency.

Figure 5:
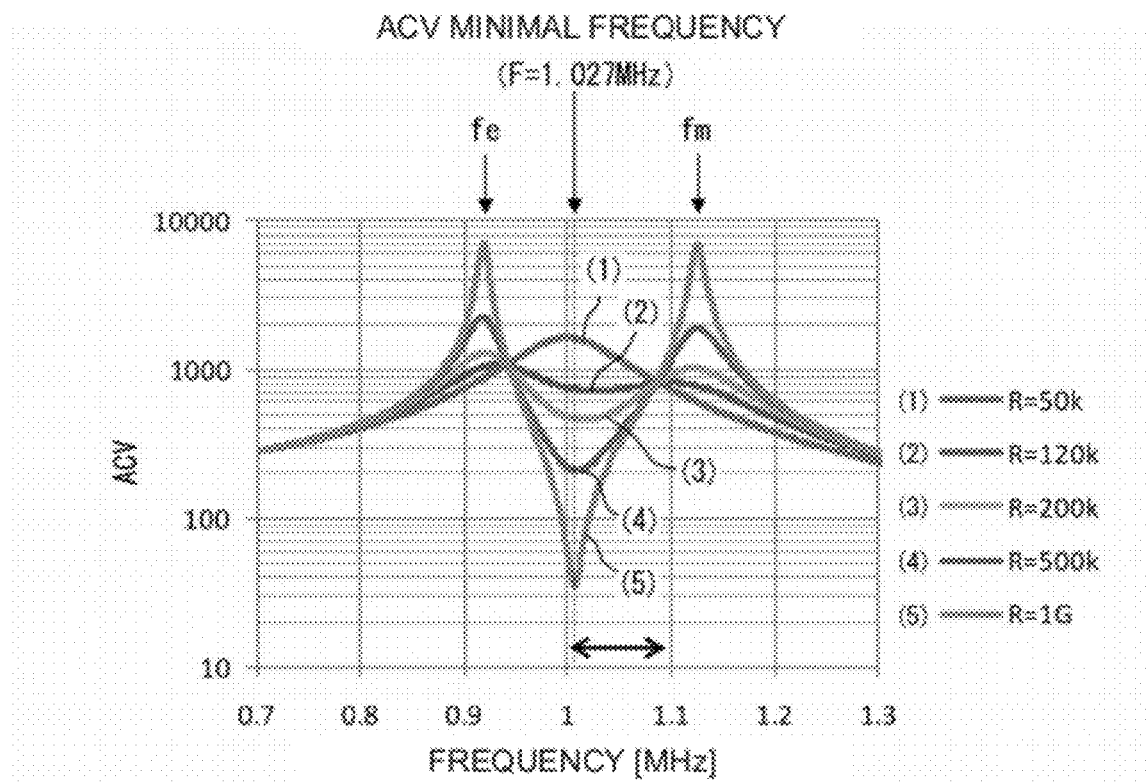
FIG. 5 is a graph indicating frequency characteristics of a high-frequency high voltage when the resistance of the load circuit in the power receiving apparatus is varied.

FIG. 5 is a graph indicating frequency characteristics of a high-frequency high voltage ACV to be applied to the primary-side coupling electrodes when the resistance of the load circuit RL in the power receiving apparatus 201 is varied. As shown in FIG. 5, the resonant frequency is divided into a low-frequency-side resonant frequency fe and a high-frequency-side resonant frequency fm when the first resonant circuit is coupled to the second resonant circuit in the state in which the load is disconnected from the voltage step-down circuit 45 (the resistance of the load circuit RL is set to about one GΩ in calculation). A frequency exists which is between the low-frequency-side resonant frequency fe and the high-frequency-side resonant frequency fm and at which the high-frequency high voltage ACV is minimized (in this example, about 1.027 MHz).

The low-frequency-side resonant frequency fe is a resonant frequency in a boundary condition in which an equivalent electric wall exists between the first resonant circuit and the second resonant circuit. The high-frequency-side resonant frequency fm is a resonant frequency in a boundary condition in which an equivalent magnetic wall exists between the first resonant circuit and the second resonant circuit.

The two resonant frequencies are represented in the following manners:

$$fe = 1/2\pi\sqrt{(L(C+Cm))}$$

$$fm = 1/2\pi\sqrt{(L(C-Cm))}$$

where "C" denotes a capacitance of the capacitors CG and CL shown in FIG. 4A and "Cm" denotes the capacitance of the capacitor Cm.

The frequency characteristics of the high-frequency high voltage ACV gradually become gentle as the resistance of the load circuit RL is decreased, that is, as the coupling between the load and the second resonant circuit is increased. In the example in FIG. 5, the power transmission efficiency becomes optimal when R=120 kΩ.

Figure 6:
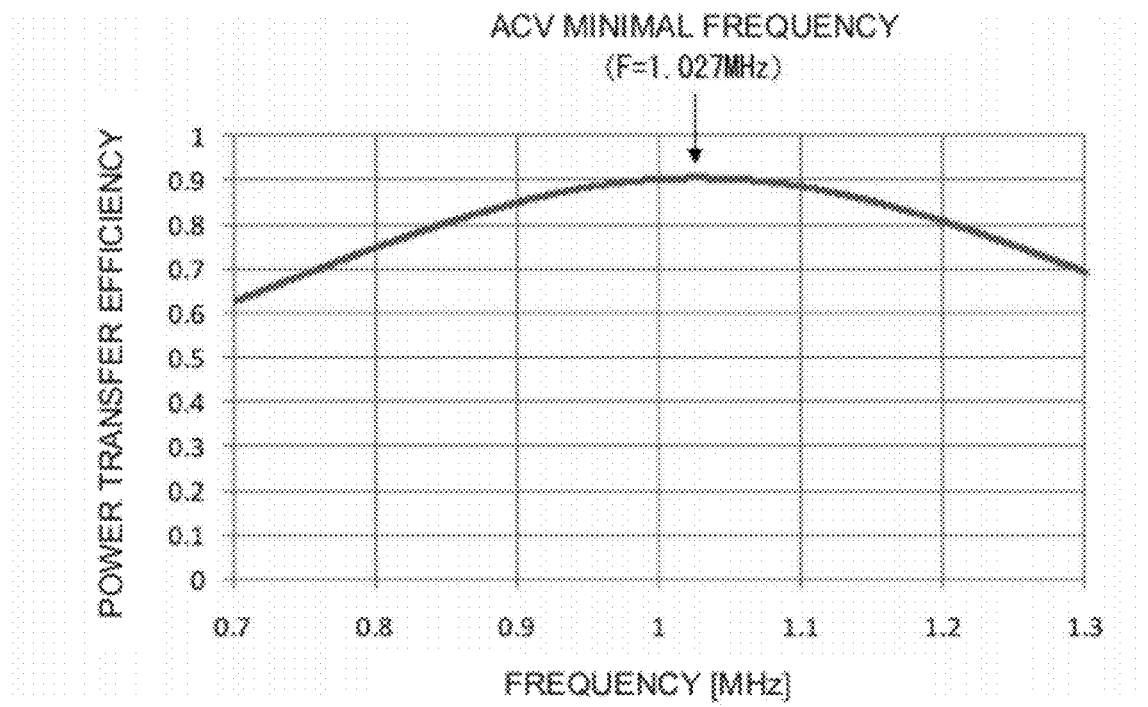
FIG. 6 is a graph indicating power transmission efficiency when $RL=120$ k$\Omega$.

FIG. 6 is a graph indicating the power transmission efficiency when RL=120 kΩ. Referring to FIG. 6, the horizontal axis represents frequency and the vertical axis represents power transmission efficiency. The frequency at which the high-frequency high voltage ACV is minimized in a state in which the load on the second resonant circuit is small is a frequency at which the power transmission efficiency when power is supplied to the load is high.

It is sufficient for an operating frequency to be close to the frequency at which the high-frequency high voltage ACV is minimized, and it is preferred that the operating frequency be selected from a frequency range about ±10% of the minimal frequency. In particular, the operating frequency is preferably a frequency between the frequency at which the voltage value is minimized and the resonant frequency (fm), which is a higher resonant frequency among the resonant frequencies (fm and fe) appearing when the first resonant circuit is coupled to the second resonant circuit. Selection of a frequency within such a frequency range allows the voltage of the power-receiving-apparatus-side passive electrode to be decreased. Within this frequency range, the absolute value of the difference in phase between the voltage difference between the power-transmission-apparatus-side active electrode and the power-transmission-apparatus-side passive electrode and the voltage difference between the power-receiving-apparatus-side active electrode and the power-receiving-apparatus-side passive electrode is higher than or equal to about zero degrees and is lower than about 90 degrees. Accordingly, since the variation in voltage at the power-receiving-apparatus-side passive electrode coincides with the variation in voltage at the power-transmission-apparatus-side passive electrode closer to a ground voltage (having the same polarity), the variation in voltage at the power-receiving-apparatus-side passive electrode can be suppressed. Consequently, it is possible to suppress unnecessary leakage of the electromagnetic field.

Figure 7:
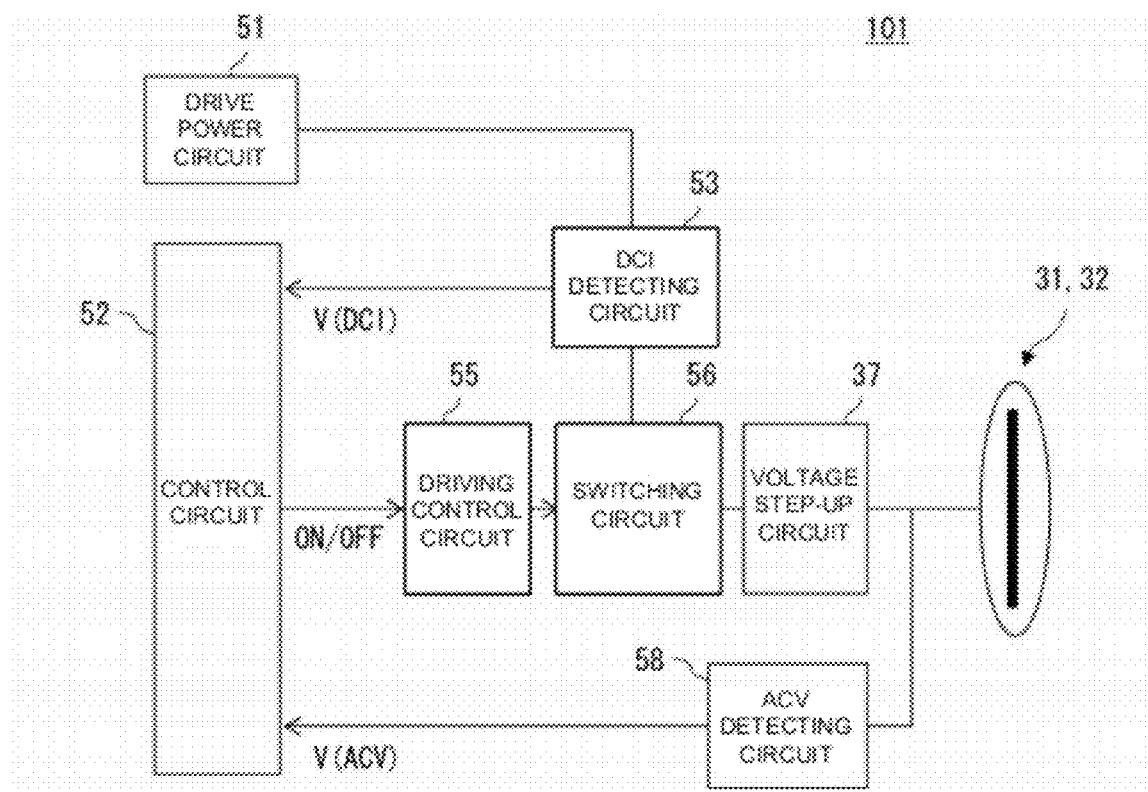
FIG. 7 is a block diagram showing an example of the configuration of the power transmission apparatus.

The configuration of the power transmission apparatus 101 will now be described in more detail. FIG. 7 is a block diagram showing an example of the configuration of the power transmission apparatus 101. Referring to FIG. 7, a drive power circuit 51 is a power circuit that receives commercial power and generates a constant direct-current (DC) voltage (for example, a DC voltage of about 5V). A control circuit 52 receives and transmits signals from and to components, described below, to control the components.

A driving control circuit 55 switches switching elements in a switching circuit 56 in accordance with ON-OFF signals supplied from the control circuit 52. The switching circuit 56 alternately drives an input part of the voltage step-up circuit 37, as described below.

A DCI detecting circuit 53 detects a driving current flowing through the switching circuit 56 (that is, the amount of current supplied from the drive power circuit 51 to the voltage step-up circuit 37). The control circuit 52 reads a detected signal V(DCI). An ACV detecting circuit 58 capacitively divides the voltage between the coupling electrodes 31 and 32 and generates a DC voltage resulting from rectification of the divided AC voltage as a detected signal V(ACV). The control circuit 52 reads the detected signal V(ACV).

Figure 8:
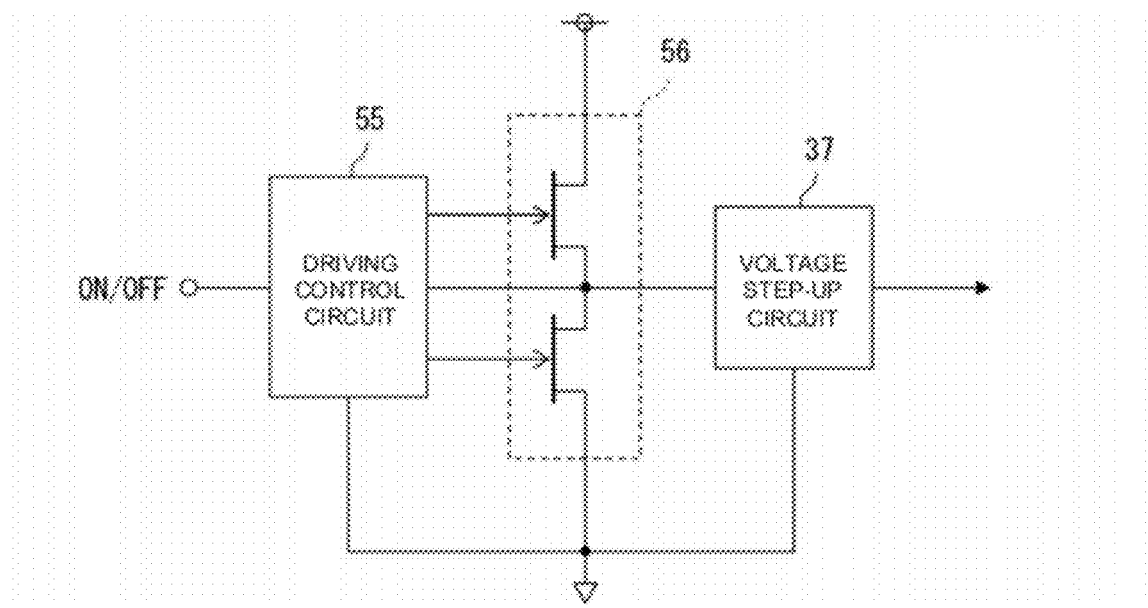
FIG. 8 illustrates an example of the relationship between a switching circuit and a driving control circuit.

FIG. 8 illustrates an example of the relationship between the switching circuit 56 and the driving control circuit 55. The switching circuit 56 performs a push-pull operation by turning on and off a high-side switching element and a low-side switching element to alternately drive the voltage step-up circuit 37.

Figure 9A:
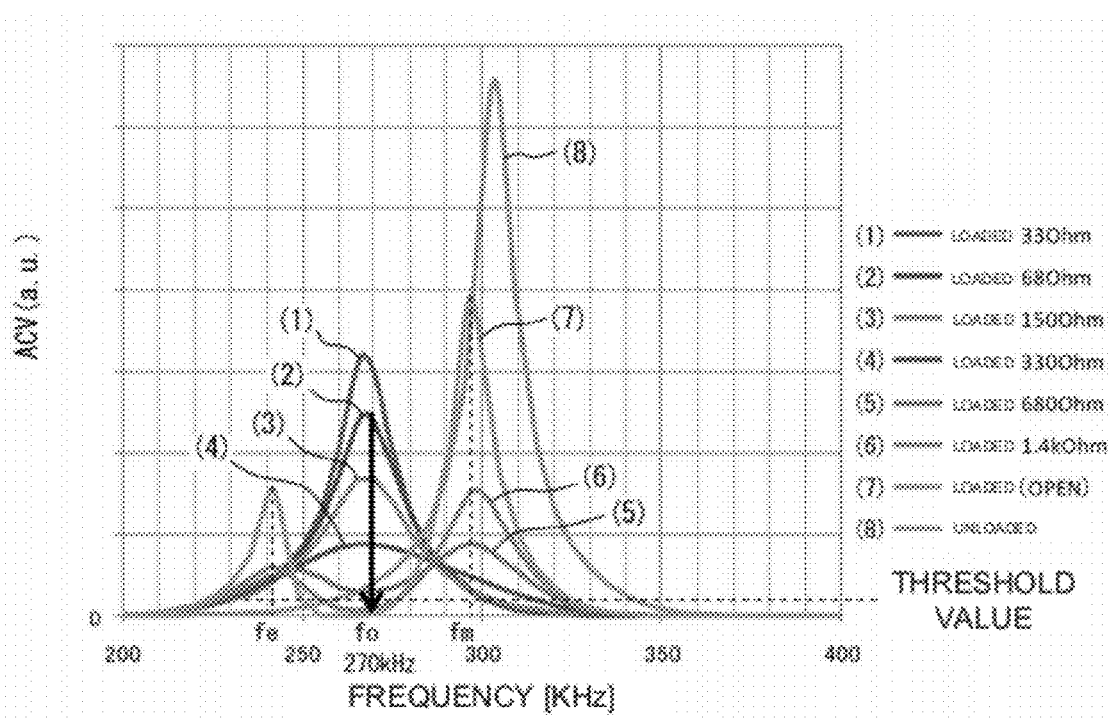
FIG. 9A is a graph showing frequency characteristics resulting from actual measurement of the high-frequency high voltage when the resistance of the load circuit in the power receiving apparatus is varied.
Figure 9B:
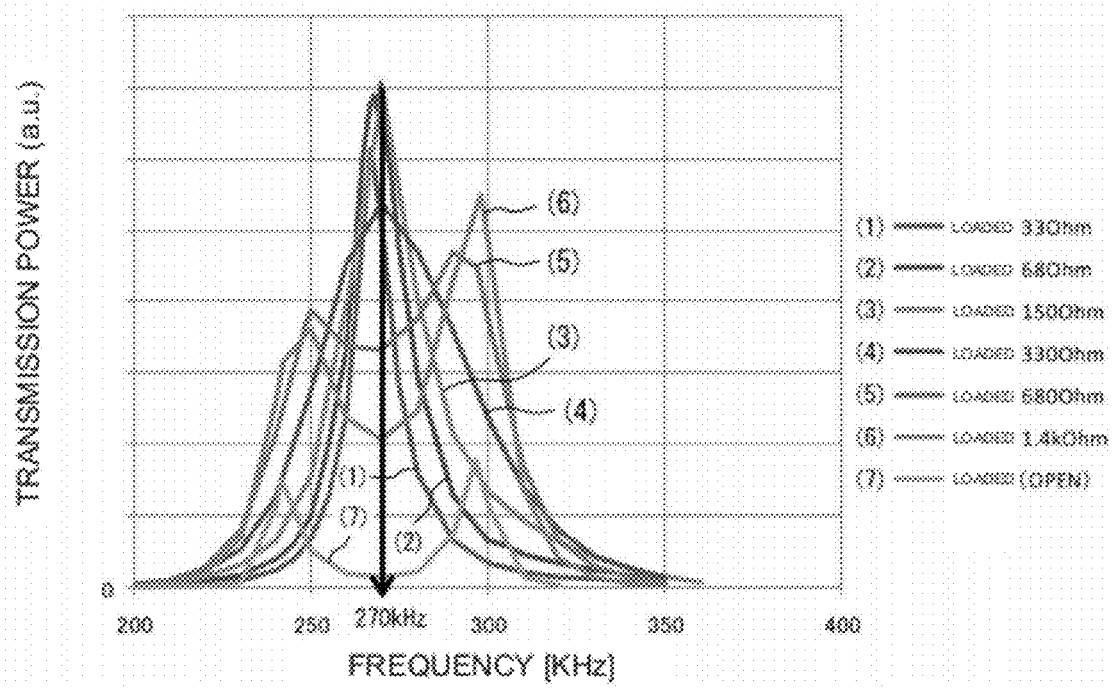
FIG. 9B is a graph showing frequency characteristics resulting from actual measurement of the power transmitted from the power transmission apparatus to the power receiving apparatus when the resistance of the load circuit in the power receiving apparatus is varied.

FIG. 9A is a graph showing frequency characteristics resulting from actual measurement of the high-frequency high voltage ACV when the resistance of the load circuit RL in the power receiving apparatus 201 is varied. FIG. 9B is a graph showing frequency characteristics resulting from actual measurement of the power transmitted from the power transmission apparatus 101 to the power receiving apparatus 201 when the resistance of the load circuit RL in the power receiving apparatus 201 is varied. The vertical axis represents an arbitrary unit (a.u.) in both the graph in FIG. 9A and that in FIG. 9B.

As shown in FIGS. 9A and 9B, the high-frequency high voltage ACV at the resonant frequency is sharply varied with the resistance of the load in the wireless power transmission system according to the first exemplary embodiment. In particular, when the resistance of the load is increased (the load becomes close to the full charge), the frequency characteristics have two peaks and the voltages near the resonant frequency are decreased. The charging status of a battery is sensitively detected by using the above effect by a control method described below to continue or stop of the power supply with high accuracy.

Figure 10:
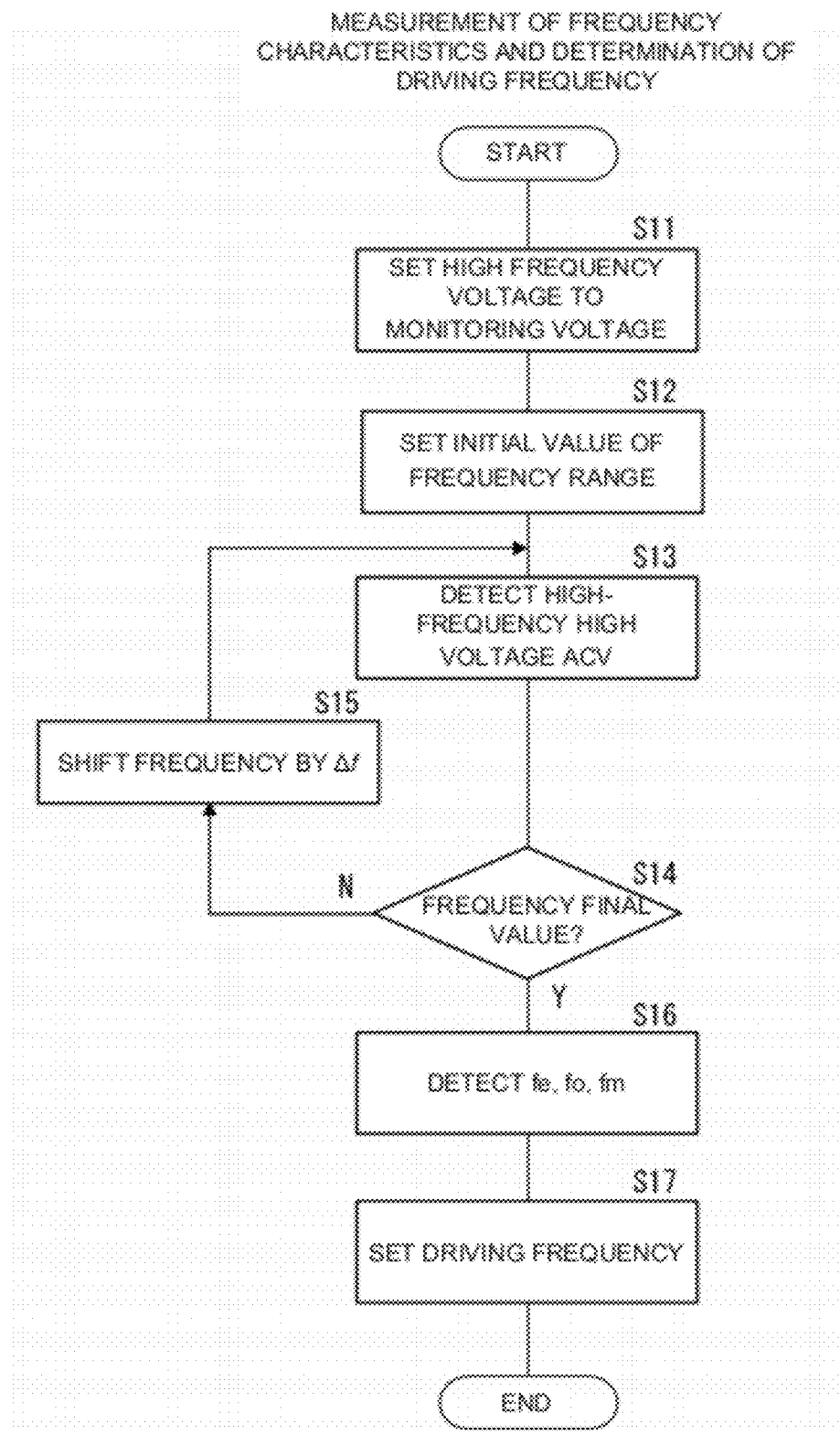
FIG. 10 is a flowchart showing an example of a process of measuring the frequency characteristics of a load and determining a driving frequency, in the content of the processing by a control circuit in FIG. 7.

FIG. 10 is a flowchart showing an example of a process of measuring the frequency characteristics of the load and determining the driving frequency, in the content of the processing by the control circuit 52 in FIG. 7.

Referring to FIG. 10, in Step S11, the control circuit 52 sets the high-frequency voltage to a monitoring voltage (e.g., a voltage lower than the voltage in the power transmission). The setting can be performed by decreasing the duty ratio of the ON signal to be supplied to the driving control circuit 55 in FIG. 7 or by offsetting the frequency from a resonant frequency f0. At this time, the diode in the rectification-smoothing circuit included in the load circuit RL shown in FIG. 4A is in an off state. Accordingly, the impedance of the load is high and the coupling between the second resonant circuit and the load is weakened.

In Step S12, the control circuit 52 sets the initial value of the frequency range to be swept and drives the driving control circuit 55 at the set frequency. In Step S13, the control circuit 52 reads the signal detected by the ACV detecting circuit 58 in this state.

In Step S14, the control circuit 52 determines whether the frequency reaches the final value. If the control circuit 52 determines that the frequency does not reach the final value (NO in Step S14), in Step S15, the control circuit 52 shifts the frequency by Δf. Then, the process goes back to Step S13. The above steps are repeated until the frequency reaches the final value. The frequency sweep is performed in the above manner.

In Step S16, the control circuit 52 detects the frequencies fe, fo, and fm on the basis of the frequency characteristics of the high-frequency voltage resulting from the frequency sweep. As shown in FIG. 9A, fe denotes a lower frequency, among the two resonant frequencies when the load is opened, fm denotes a higher frequency among them, and fo denotes a frequency at which the high-frequency voltage is minimized. Accordingly, in Step S17, the control circuit 52 sets the driving frequency to fo.

Figure 11:
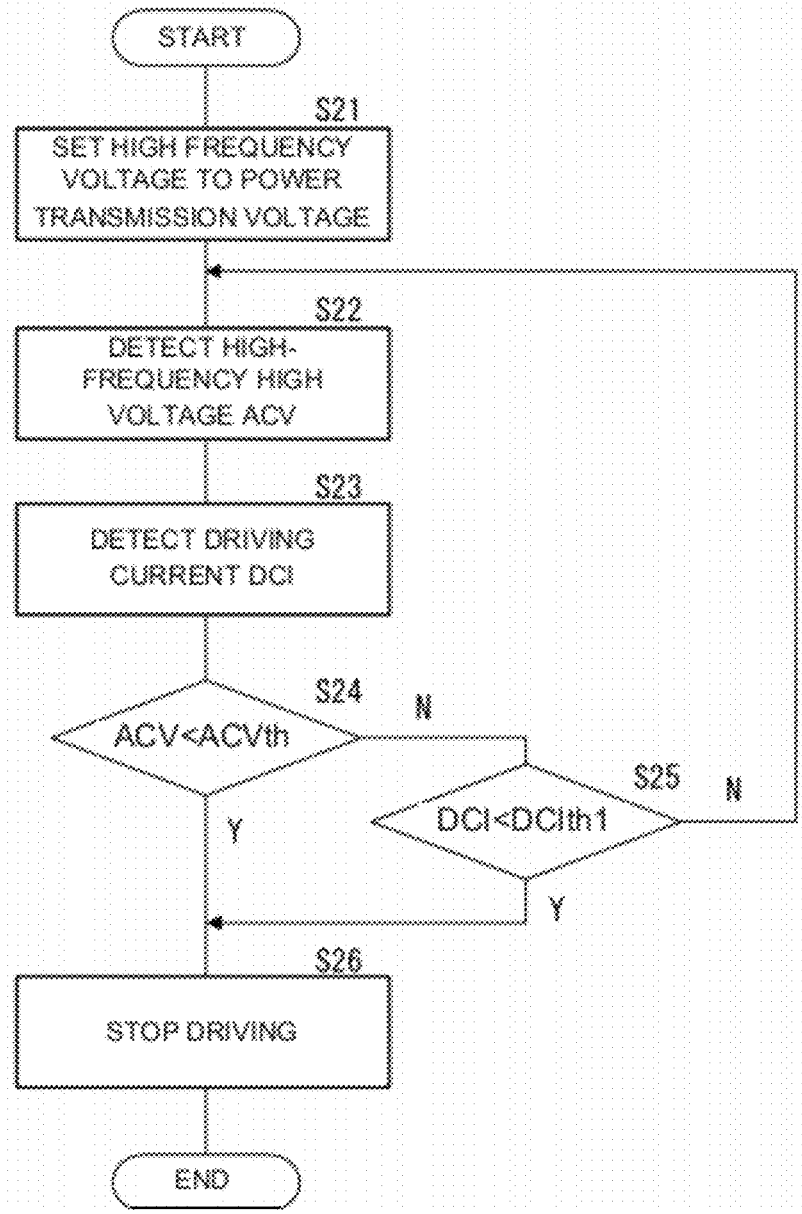
FIG. 11 is a flowchart showing an example of a process concerning start and stop of the power transmission, in the content of the processing by the control circuit in FIG. 7.

FIG. 11 is a flowchart showing an example of a process concerning start and stop of the power transmission, in the content of the processing by the control circuit 52 in FIG. 7.

Referring to FIG. 11, in Step S21, the control circuit 52 sets the high-frequency voltage to a power transmission voltage. The setting is performed by increasing the duty ratio of the ON signal to be supplied to the driving control circuit 55 in FIG. 7 or by varying the frequency. At this time, the magnitude of the load is determined by the state of the secondary cell included in the load circuit RL shown in FIG. 4A.

In Step S22, the control circuit 52 reads the high-frequency high voltage ACV. In Step S23, the control circuit 52 reads a driving current DCI flowing through the switching circuit 56. In Step S24, the control circuit 52 determines whether the high-frequency high voltage ACV is lower than a threshold value ACVth. If the control circuit 52 determines that the high-frequency high voltage ACV is not lower than the threshold value ACVth (NO in Step S24), in Step S25, the control circuit 52 determines whether the driving current DCI is lower than a threshold value DCIth1. If the control circuit 52 determines that the driving current DCI is not lower than the threshold value DCIth1 (NO in Step S25), the process goes back to Step S22.

If the control circuit 52 determines that the high-frequency high voltage ACV is lower than the threshold value ACVth (YES in Step S24) or if the control circuit 52 determines that the driving current DCI is lower than the threshold value DCIth1 (YES in Step S25), in Step S26, the control circuit 52 stops the driving of the driving control circuit 55.

As described above, the fact that the secondary cell is in the load state corresponding to the full charge state can be detected by using the high-frequency high voltage ACV or the driving current DCI to stop the charge.

Since the ACV detecting circuit 58 in FIG. 7 detects the voltage between the coupling electrodes 31 and 32 by capacitance division and detects the voltage between the coupling electrodes 31 and 32, instead of the current through the resonant circuit, the control circuit 52 can accurately monitor the voltage applied between the coupling electrodes 31 and 32. Accordingly, the control circuit 52 can feed back the detected voltage V(ACV) for the high-frequency high voltage ACV to easily stabilize the control without overvoltage applied between the coupling electrodes 31 and 32.

A power transmission system according to a second exemplary embodiment monitors the driving current DCI in a state in which the high-frequency high voltage generating circuit is operated at a monitoring frequency different from the driving frequency and compares the driving current DCI with a threshold value to detect whether the power receiving apparatus is placed and held. The circuit configuration of the apparatuses is the same as the one shown in the first exemplary embodiment.

Figure 12:
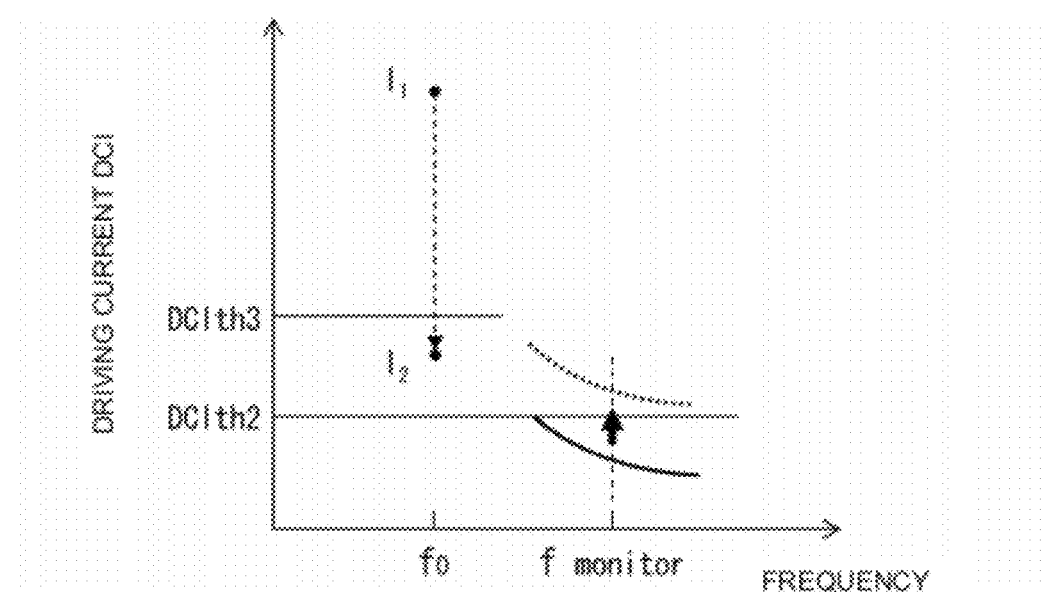
FIG. 12 is a graph showing an example of the relationship between the driving frequency and a monitoring frequency.

FIG. 12 is a graph showing an example of the relationship between the driving frequency and the monitoring frequency. The driving frequency fo is a frequency at which the high-frequency voltage when the load is opened is minimized, as described above in the first exemplary embodiment. A monitoring frequency f monitor is higher than the driving frequency fo in the example in FIG. 12. For example, the monitoring frequency f monitor is set at a side higher than the frequency fm.

Figure 13:
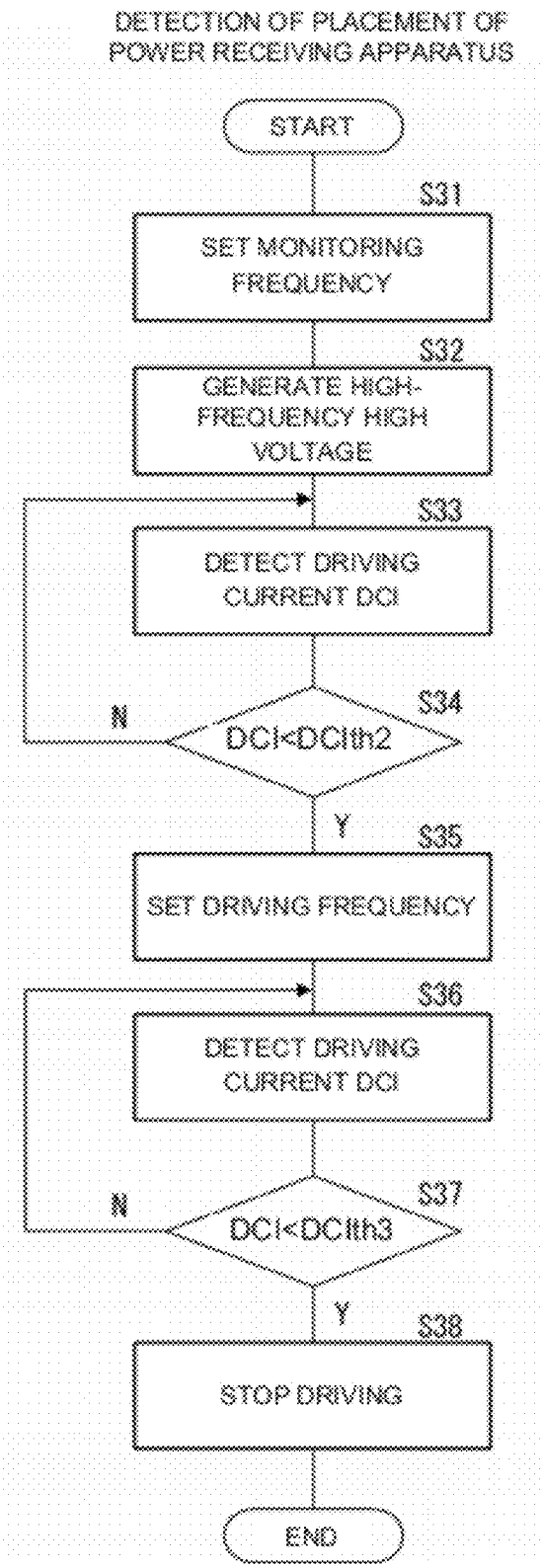
FIG. 13 is a flowchart showing an example of a process of detecting the placement of the power receiving apparatus on the power transmission apparatus and the subsequent processing, in the content of the processing by the control circuit in FIG. 7.

FIG. 13 is a flowchart showing an example of a process of detecting the placement of the power receiving apparatus on the power transmission apparatus and the subsequent processing, in the content of the processing by the control circuit 52 in FIG. 7.

Referring to FIG. 13, in Step S31, the control circuit 52 sets the monitoring frequency f monitor. In Step S32, the control circuit 52 generates the high-frequency high voltage at the monitoring frequency f monitor. In Step S33, the control circuit 52 detects the driving current DCI. In Step S34, the control circuit 52 determines whether the driving current DCI exceeds a threshold value DCIth2. If the control circuit 52 determines that the driving current DCI does not exceed the threshold value DCIth2 (NO in Step S34), the process goes back to Step S33. The threshold value DCIth2 is a value used to detect whether the power receiving apparatus to which power is transmitted is placed and held. When the high-frequency voltage is generated at the monitoring frequency f monitor, any metal body that is placed and held does not resonate and the capacitive coupling hardly occurs. Accordingly, the power transmission is not performed and the safety is ensured.

When the power receiving apparatus including the secondary cell for which the charge is required is placed and held, the driving current DCI is increased. If the control circuit 52 determines that the driving current DCI exceeds the threshold value DCIth2 (YES in Step S34), in Step S35, the control circuit 52 sets the driving frequency. In Step S36, the control circuit 52 generates the high-frequency high voltage at the driving frequency to detect the driving current DCI. In Step S37, the control circuit 52 determines whether the driving current DCI is lower than a threshold value DCIth3. If the control circuit 52 determines that the driving current DCI is not lower than the threshold value DCIth3 (NO in Step S37), the process goes back to Step S36. The threshold value DCIth3 is a value used to detect whether the driving current has a value at which the power transmission should be stopped. For example, when the secondary cell is in the full charge state or when the power receiving apparatus is removed, the driving current DCI becomes lower than the threshold value DCIth3. If the control circuit 52 determines that the driving current DCI is lower than the threshold value DCIth3 (YES in Step S37), in Step S38, the control circuit 52 stops the driving.

As described above, since the current flowing when the high-frequency voltage at the monitoring frequency f monitor offset from the resonant frequency fo is applied is detected to detect or determine whether the power receiving apparatus is placed and held in the power transmission system according to the second exemplary embodiment, it is possible to lower the high-frequency high voltage in the state in which the placement of the power receiving apparatus is waited for. In other words, since the first resonant circuit does not resonate at the monitoring frequency f monitor, the step-up ratio is low and the voltage to be applied to the primary-side coupling electrodes is low. Consequently, it is possible to suppress corona discharge and to greatly reduce the unnecessary leakage of the electromagnetic field.

The monitoring frequency f monitor may be lower than the resonant frequency fo as long as the monitoring frequency f monitor is offset from the resonant frequency fo. However, if the monitoring frequency f monitor is set at a side higher than the resonant frequency fo, the voltage at the primary-side coupling electrodes is decreased and the driving current is reduced when a foreign body, such as a metal body, other than the power receiving apparatus is placed and held. Accordingly, this setting has the advantage of easily discriminating the foreign body from the power receiving apparatus. This is because, when the foreign body is placed and held, the capacitance between the power transmission apparatus and the power receiving apparatus (the capacitance of the coupling part) is increased and the resonant frequency is decreased, thereby further increasing the difference between the resonant frequency and the monitoring frequency f monitor.

A special switch is not required in the first exemplary embodiment because the voltage that is generated is lowered in the measurement of the frequency characteristics of the high-frequency voltage to set the diode in the rectification-smoothing circuit included in the load circuit to the off state. When the voltage that is generated is not lowered, the switch may be used to disconnect the second resonant circuit from the load circuit, as shown in FIG. 4B, in the measurement of the frequency characteristics of the high-frequency voltage. The switch may not necessarily be opened. It is sufficient for the load circuit to have an impedance that is sufficiently higher than that of the second resonant circuit.

In the above manner, it is possible to weaken the coupling between the second resonant circuit and the load circuit by increasing the impedance of the load circuit in the monitoring state and to supply power to the load circuit in the normal power reception.

With the above configurations, the frequency at which a highest coupling level is achievable can be set in a short time.

With a power transmission system having any of the above configurations, the frequency of the voltage that a power transmission apparatus should generate can be optimized to easily maximize the power to be transmitted from the power transmission apparatus to a power receiving apparatus.

With configurations of a power transmission system according to the disclosure, the variation in voltage at the secondary-side coupling electrode can be suppressed to suppress unnecessary leakage of the electromagnetic field.

Additionally, configurations of a power transmission system according to the disclosure can automatically stop power transmission if the power transmitted from the power transmission apparatus to the power receiving apparatus is lowered to a certain amount.

Also, with embodiments consistent with the disclosure detection of the coupling of a power receiving apparatus to the power transmission apparatus and the start of the power transmission can be easily realized by the simple control method.

With embodiments according to the disclosure, a decrease of power transmitted from the power transmission apparatus to the power receiving apparatus to a certain amount can be detected by the simple method to automatically stop the power transmission.

Embodiments according to the disclosure can make it possible to optimize the frequency of the high voltage that the power transmission apparatus should generate to easily maximize the power transmitted from the power transmission apparatus to a power receiving apparatus.

While preferred embodiments have been described above, it is to be understood that variations and modifications will be apparent to those skilled in the art without departing from the scope and spirit of the disclosure. The scope of the invention, therefore, is to be determined solely by the following claims.

What is claimed is:

1. A power transmission system comprising:
   a power transmission apparatus including a primary-side coupling electrode configured to electrically couple to a secondary-side coupling electrode and connected to a load circuit of a power receiving apparatus, a high-frequency voltage generating circuit configured to generate and apply a high-frequency voltage to the primary-side coupling electrode, and a driving power circuit that supplies driving power to the high-frequency voltage generating circuit;
   a center frequency acquiring unit configured to sweep a frequency range to acquire a center frequency in a state in which electrical coupling between the secondary-side coupling electrode and the load circuit is weakened, the center frequency being a frequency at which the generated high-frequency voltage is minimized or substantially minimized with respect to variation in frequency of the high-frequency voltage generated by the high-frequency voltage generating circuit; and
   a control unit configured to set a driving frequency, which is the frequency of the high-frequency voltage generated by the high-frequency high voltage generating circuit, to the center frequency or a frequency near the center frequency and supply power to the power receiving apparatus;
   wherein a resonant frequency of a first resonant circuit composed of the primary-side coupling electrode and the high-frequency voltage generating circuit substantially coincides with a resonant frequency of a second resonant circuit composed of the secondary-side coupling electrode and the load circuit, and
   wherein the center frequency acquiring unit is further configured to acquire the high-frequency voltage within a frequency range including the frequencies of two coupling modes occurring in a state in which the first resonant circuit is coupled to the second resonant circuit.

2. The power transmission system according to claim 1,
   wherein a resonant frequency of a first resonant circuit composed of the primary-side coupling electrode and the high-frequency voltage generating circuit substantially coincides with a resonant frequency of a second resonant circuit composed of the secondary-side coupling electrode and the load circuit, and
   wherein the control unit is further configured to set the driving frequency within a frequency range from a higher frequency, among the frequencies of two coupling modes occurring in a state in which the first resonant circuit is coupled to the second resonant circuit, to the center frequency.

3. The power transmission system according to claim 1, further comprising:
   a voltage detecting unit configured to detect a high-frequency voltage generated by the high-frequency voltage generating circuit,
   wherein the control unit is further configured to stop the supply of the power from the driving power circuit to the high-frequency voltage generating circuit if the voltage detected by the voltage detecting unit is lower than a threshold value.

4. The power transmission system according to claim 1,
   wherein the power transmission apparatus further includes a current detecting unit configured to detect an amount of current supplied from the driving power circuit to the high-frequency voltage generating circuit or an amount of current supplied from the high-frequency voltage generating circuit to the primary-side coupling electrode, and
   wherein the control unit is further configured to monitor the detected amount of supplied current in a state in which the high-frequency voltage generating circuit is operated at a monitoring frequency different from the driving frequency and, if the detected amount of supplied current is higher than or equal to a threshold value, the control unit operates the high-frequency voltage generating circuit at the driving frequency to supply power to the power receiving apparatus.

5. The power transmission system according to claim 1,
   wherein the power transmission apparatus further includes a current detecting unit configured to detect the amount of current supplied from the driving power circuit to the high-frequency voltage generating circuit or the amount of current supplied from the high-frequency voltage generating circuit to the primary-side coupling electrode, and
   wherein the control unit is further configured to stop the supply of the power from the driving power circuit to the high-frequency voltage generating circuit if the detected amount of supplied current is lower than or equal to a threshold value.

6. The power transmission system according to claim 1, further comprising:
   the power receiving apparatus including the secondary-side coupling electrode electrically couplable to the primary-side coupling electrode and the load circuit connected to the secondary-side coupling electrode.

7. The power transmission system according to claim 1, further comprising:
   a voltage detecting unit configured to detect a high-frequency voltage generated by the high-frequency voltage generating circuit, wherein the control unit is further configured to stop the supply of the power from the driving power circuit to the high-frequency voltage generating circuit if the voltage detected by the voltage detecting unit is lower than a threshold value.

8. The power transmission system according to claim 1, wherein the power transmission apparatus further includes a current detecting unit configured to detect an amount of current supplied from the driving power circuit to the high-frequency voltage generating circuit or an amount of current supplied from the high-frequency voltage generating circuit to the primary-side coupling electrode, and wherein the control unit is further configured to monitor the detected amount of supplied current in a state in which the high-frequency voltage generating circuit is operated at a monitoring frequency different from the driving frequency and, if the detected amount of supplied current is higher than or equal to a threshold value, the control unit operates the high-frequency voltage generating circuit at the driving frequency to supply power to the power receiving apparatus.

9. The power transmission system according to claim 1, wherein the power transmission apparatus further includes a current detecting unit configured to detect the amount of current supplied from the driving power circuit to the high-frequency voltage generating circuit or the amount of current supplied from the high-frequency voltage generating circuit to the primary-side coupling electrode, and
wherein the control unit is further configured to stop the supply of the power from the driving power circuit to the high-frequency voltage generating circuit if the detected amount of supplied current is lower than or equal to a threshold value.

10. The power transmission system according to claim 1, further comprising:
the power receiving apparatus including the secondary-side coupling electrode electrically couplable to the primary-side coupling electrode and the load circuit connected to the secondary-side coupling electrode.

11. The power transmission system according to claim 2, further comprising:
a voltage detecting unit configured to detect a high-frequency voltage generated by the high-frequency voltage generating circuit,
wherein the control unit is further configured to stop the supply of the power from the driving power circuit to the high-frequency voltage generating circuit if the voltage detected by the voltage detecting unit is lower than a threshold value.

12. The power transmission system according to claim 2, wherein the power transmission apparatus further includes a current detecting unit configured to detect an amount of current supplied from the driving power circuit to the high-frequency voltage generating circuit or an amount of current supplied from the high-frequency voltage generating circuit to the primary-side coupling electrode, and
wherein the control unit is further configured to monitor the detected amount of supplied current in a state in which the high-frequency voltage generating circuit is operated at a monitoring frequency different from the driving frequency and, if the detected amount of supplied current is higher than or equal to a threshold value, the control unit operates the high-frequency voltage generating circuit at the driving frequency to supply power to the power receiving apparatus.

13. The power transmission system according to claim 2, wherein the power transmission apparatus further includes a current detecting unit configured to detect the amount of current supplied from the driving power circuit to the high-frequency voltage generating circuit or the amount of current supplied from the high-frequency voltage generating circuit to the primary-side coupling electrode, and
wherein the control unit is further configured to stop the supply of the power from the driving power circuit to the high-frequency voltage generating circuit if the detected amount of supplied current is lower than or equal to a threshold value.

14. The power transmission system according to claim 2, further comprising:
the power receiving apparatus including the secondary-side coupling electrode electrically couplable to the primary-side coupling electrode and the load circuit connected to the secondary-side coupling electrode.

15. The power transmission system according to claim 3, wherein the power transmission apparatus further includes a current detecting unit configured to detect an amount of current supplied from the driving power circuit to the high-frequency voltage generating circuit or an amount of current supplied from the high-frequency voltage generating circuit to the primary-side coupling electrode, and
wherein the control unit is further configured to monitor the detected amount of supplied current in a state in which the high-frequency voltage generating circuit is operated at a monitoring frequency different from the driving frequency and, if the detected amount of supplied current is higher than or equal to a threshold value, the control unit operates the high-frequency voltage generating circuit at the driving frequency to supply power to the power receiving apparatus.

16. The power transmission system according to claim 3, wherein the power transmission apparatus further includes a current detecting unit configured to detect the amount of current supplied from the driving power circuit to the high-frequency voltage generating circuit or the amount of current supplied from the high-frequency voltage generating circuit to the primary-side coupling electrode, and
wherein the control unit is further configured to stop the supply of the power from the driving power circuit to the high-frequency voltage generating circuit if the detected amount of supplied current is lower than or equal to a threshold value.

17. The power transmission system according to claim 3, further comprising:
the power receiving apparatus including the secondary-side coupling electrode electrically couplable to the primary-side coupling electrode and the load circuit connected to the secondary-side coupling electrode.

18. The power transmission system according to claim 4, wherein the power transmission apparatus further includes a current detecting unit configured to detect the amount of current supplied from the driving power circuit to the high-frequency voltage generating circuit or the amount of current supplied from the high-frequency voltage generating circuit to the primary-side coupling electrode, and
wherein the control unit is further configured to stop the supply of the power from the driving power circuit to the high-frequency voltage generating circuit if the detected amount of supplied current is lower than or equal to a threshold value.

19. The power transmission system according to claim 4, further comprising:
the power receiving apparatus including the secondary-side coupling electrode electrically couplable to the primary-side coupling electrode and the load circuit connected to the secondary-side coupling electrode.

* * * * *